United States Patent
Chang et al.

(10) Patent No.: US 10,177,523 B2
(45) Date of Patent: Jan. 8, 2019

(54) RECOVERING A RARE-EARTH-DOPED OPTICAL FIBER UNDER IRRADIATION

(71) Applicant: NATIONAL APPLIED RESEARCH LABORATORIES, Taipei (TW)

(72) Inventors: Sheng Hsiung Chang, Taoyuan (TW); Ren-Young Liu, Hsinchu (TW); Chii-Chang Chen, Taoyuan (TW); Chao-Yi Tai, Taoyuan (TW)

(73) Assignee: NATIONAL APPLIED RESEARCH LABORATORIES, Taipei (TW)

(*) Notice: Subject to any disclaimer, the term of this patent is extended or adjusted under 35 U.S.C. 154(b) by 322 days.

(21) Appl. No.: 14/854,020

(22) Filed: Sep. 14, 2015

(65) Prior Publication Data

US 2017/0077668 A1    Mar. 16, 2017

(51) Int. Cl.
| | |
|---|---|
| H01S 3/094 | (2006.01) |
| H01S 3/00 | (2006.01) |
| H01S 3/16 | (2006.01) |
| H01S 3/067 | (2006.01) |
| G02B 6/00 | (2006.01) |

(52) U.S. Cl.
CPC ...... *H01S 3/094076* (2013.01); *H01S 3/0007* (2013.01); *G02B 6/00* (2013.01); *H01S 3/0014* (2013.01); *H01S 3/06795* (2013.01); *H01S 3/1608* (2013.01)

(58) Field of Classification Search
CPC ............. H01S 3/094076; H01S 3/0007; H01S 3/0014; H01S 3/1608
See application file for complete search history.

(56) References Cited

U.S. PATENT DOCUMENTS

| | | | |
|---|---|---|---|
| 6,452,717 B1* | 9/2002 | Endo | ................... H01S 3/06754 359/337 |
| 2012/0081781 A1* | 4/2012 | Peng | ...................... H01S 3/067 359/341.3 |

(Continued)

OTHER PUBLICATIONS

Sheng Hsiung Chang, Ren-Young Liu, Chu-En Lin, Chao-Yi Tai, Chii-Chang Chen "1550-nm fluorescence efficiency and heat generation of erbium-doped fiber pumped by pulsed and quasi-continuous-wave lasers" Aerospace Science and Technology 39 (2014) 187-189.

*Primary Examiner* — Eric L Bolda
(74) *Attorney, Agent, or Firm* — Anna Tsang

(57) ABSTRACT

An optical fiber apparatus and a method of recovering radiation-induced-attenuation (RIA) onto a rare-earth-doped optical fiber under irradiation are provided in this disclosure. A light source is coupled to a rare-earth doped optical fiber. The light source emits a combination of mode locked pulsed light and non-mode locked quasi-continuous-wave light. The mode locked pulsed light are used to recover RIA onto the rare-earth doped optical fiber in real time, and the non-mode locked light are used to pump the rare-earth doped optical fiber as a gain medium. Each pulsed duration of the mode locked pulsed light is much shorter than operation duration of the non-mode locked light, such that an instantaneous power of the mode locked pulsed light exceeds a saturated pumping power required for the rare-earth doped optical fiber, so as to effectively elevate the core temperature of rare-earth doped fiber to achieve a confined photo-annealed recovery of RIA onto rare-earth doped fibers.

15 Claims, 14 Drawing Sheets

(56) References Cited

U.S. PATENT DOCUMENTS

2013/0182726 A1* 7/2013 Kim .................. H01S 3/106
                                                                372/6
2016/0164609 A1* 6/2016 Hill .................... H01S 3/06716
                                                                398/121

\* cited by examiner

RECOVERING A RARE-EARTH-DOPED OPTICAL FIBER UNDER IRRADIATION

BACKGROUND

Field of Invention

The disclosure relates to optical fibers. More particularly, the disclosure relates to an apparatus and a method of recovering optical power degradation of rare-earth-doped optical fibers under irradiation.

Description of Related Art

Space technology plays an increasingly important role in our daily life. However, spacecraft is typically hard or expensive to reach for service after launch. Therefore, components, sub-assemblies and systems for space applications require special design and rigorous test in order to perform over space environment, especially irradiation.

Due to the advantages of light weight, compact size, broad bandwidth, and resistance of electromagnetic interference, fiber optics systems and assemblies have been developed and employed for space and nuclear facilities applications including communication, sensing, navigations and etc. However, it has been known that the performance of an optical-fiber-based device would be severely degraded by the RIA (Radiation-Induced-Attenuation). The RIA could cause severe output power loss of the optical-fiber-based device, and hence greatly limits its operating life.

Some methods, such as thermal annealing, hydrogen pre-loading, and photo-annealing, have been reported to reduce the RIA effect onto optical fibers. For thermal annealing, it typically requires to take up to 300° C. to decrease RIA effectively. Such a high temperature environment could damage the device itself, and therefore could not be employed practically.

For hydrogen pre-loading method, it needs a hermetic coating to avoid out-diffusion of hydrogen, and the fabrication process of a hermetic coating might be complicated and add additional cost, and could limit flexibility in tight bending.

The photo-annealing of irradiated fibers has been studied for many years. The fibers used in previous studies are pure core fibers and Ge-doped fibers. It has been known that some Si and Ge related defects can efficiently be photo-annealed. However, the RIA of an Al-doped EDF (erbium-doped fiber) is dominated by Al related defects, not Si or Ge related defects. The effect of RIA recovery in Al-doped EDF by photo-annealing method was reported by Peng and et al [U.S. Pat. No. 9,077,143, and U.S. Pat. No. 8,578,739]. However, those two patents did not cover the employment of the unique laser mode switching technique as disclosed in the present invention to achieve pumping and photo-annealed effects sequentially onto a rare-earth-doped fiber assembly under irradiation.

SUMMARY

Accordingly, an optical fiber apparatus and a method of recovering radiation-induced-attenuation (RIA) onto a rare-earth-doped optical fiber under irradiation are provided in this disclosure to solve the problems mentioned above.

In this disclosure, the optical fiber apparatus comprises an optical fiber assembly and a light source coupled to the optical fiber assembly. The optical fiber assembly comprises at least a rare-earth-doped optical fiber. The light source is used for emitting a combination of mode locked pulsed light and non-mode locked quasi-continuous-wave light. The mode locked pulsed light is used to recover RIA onto the rare-earth-doped optical fiber in real time. The non-mode locked light is used to pump the rare-earth doped optical fiber. Each pulsed duration of the mode locked pulsed light is shorter than operation duration of the non-mode locked quasi-continuous-wave light.

The method of recovering RIA onto a rare-earth-doped optical fiber under irradiation comprises coupling a light source to a rare-earth doped optical fiber, and emitting a combination of mode locked pulsed light and non-mode locked quasi-continuous-wave light by the light source. The mode locked pulsed light is used to recover RIA onto the rare-earth doped optical fiber in real time, and the non-mode locked light is used to pump the rare-earth doped optical fiber. Each pulsed duration of the mode locked pulsed light is shorter than operation duration of the non-mode locked quasi-continuous-wave light.

According to an embodiment, the light source is a laser or a broadband light source.

According to another embodiment, a wavelength of the mode locked pulsed light and the non-mode locked quasi-continuous-wave light is 550-1200 nm.

According to another embodiment, the light source is an optical amplifying light source or a photo-annealing light source.

According to another embodiment, an instantaneous power of the mode locked pulsed light exceeds a saturated pumping power required for the rare-earth doped optical fiber, such that an output light power from the rare-earth doped optical fiber is insensitive to the variation of the mode-lock pulse duration.

According to another embodiment, the mode locked pulsed light may raise a core temperature of the rare-earth doped optical fiber to a temperature of at least 300° C.

According to another embodiment, the mode locked pulsed light may recover at least 50% of the RIA onto the rare-earth doped optical fiber.

According to another embodiment, the mode locked pulsed light may recover the RIA on the rare-earth doped optical fiber at least partially in a range of 400-2000 nm.

According to another embodiment, the rare-earth doped optical fiber is doped by at least a rare-earth ion selected from a group consisting of Pr, Nd, Dy, Ho, Er, Tm, Yb, and any combinations thereof. Optionally, the rare-earth doped optical fiber may also be additionally doped by other dopants.

In light of foregoing, an apparatus and a method of real-time recovering RIA onto a rare-earth-doped optical fiber are provided. In this disclosure, only one single light source is needed to be the pumping light source and the recovering light source. The light source is operated to be switched between a locked mode and a non-locked mode. This real-time recovering apparatus and method can be used to construct an anti-irradiation optical fiber component, module or system to be used in radiation environment, such as space, aerospace, nuclear facility or instrument and etc.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
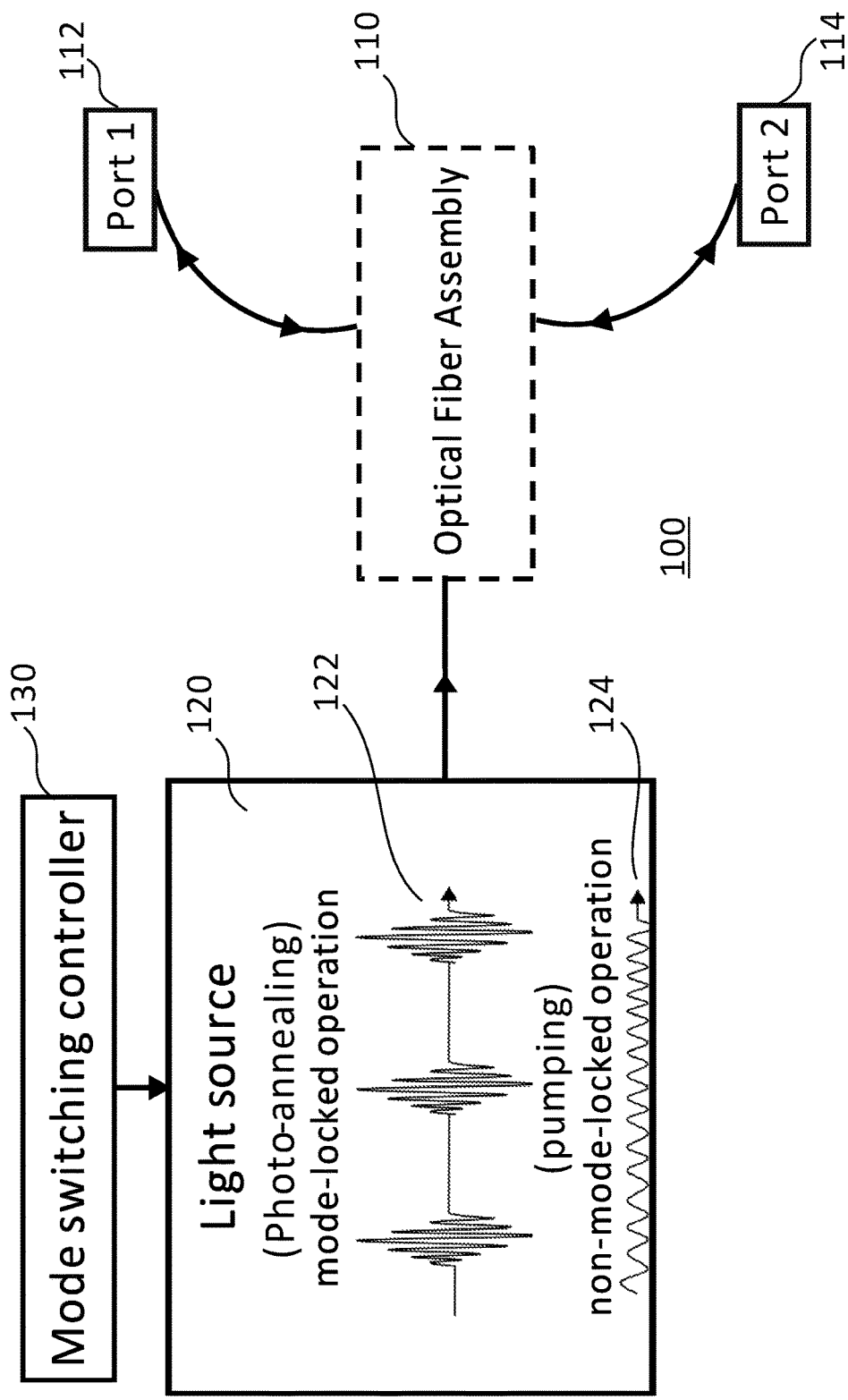
FIG. 1A is a general schematic diagram of an optical fiber apparatus showing an optical fiber assembly, with two bidirectional input/output ports, connected to a light source with mode switching control.

Reference will now be made in detail to the present embodiments of the invention, examples of which are illustrated in the accompanying drawings. Wherever possible, the same reference numbers are used in the drawings and the description to refer to the same or like parts.

In this disclosure, an apparatus and a method of real-time recovering radiation-induced-attenuation (RIA) onto a rare-earth-doped optical fiber are provided.

Optical Fiber Apparatus

FIG. 1A is a general schematic diagram of an optical fiber apparatus showing an optical fiber assembly, with two bidirectional input/output ports, connected to a light source with mode switching control. In FIG. 1A, the optical fiber apparatus 100 comprises an optical fiber assembly 110 and a light source 120 coupled to the optical fiber assembly 110. The light source 120 is in either mode locked or non-mode locked operation through a mode switching controller 130. The optical fiber assembly 110 comprises at least a rare-earth doped optical fiber (not shown in FIG. 1). The optical fiber assembly 110 may have a first port 112 and a second port 114. Both 112 and 114 can be an input port, an output port, or an unused port.

The light source 120 is used for emitting a combination of mode locked pulsed light 122 and non-mode locked quasi-continuous-wave light 124. In an embodiment, the light source 120 is a laser or a broadband light source. In another embodiment, a wavelength emitted by the light source 120 is 550-1200 nm. That is, the wavelength of the mode locked pulsed light 122 and the non-mode locked quasi-continuous-wave light 124 is 550-1200 nm.

In this disclosure, "mode-lock" is a technique in optics by which a light source can be made to produce pulsed light of extremely short duration, such as in the order of picoseconds ($10^{-12}$ s) to femtoseconds ($10^{-15}$ s). The basis of the technique is to induce a fixed-phase relationship between the longitudinal modes of the laser's resonant cavity. The laser is then said to be 'phase-locked' or 'mode-locked'. Interference between these modes causes the laser light to be produced as a train of pulses. Depending on the properties of the laser, these pulses may be of extremely brief duration, as short as a few femtoseconds.

Figure 1B:
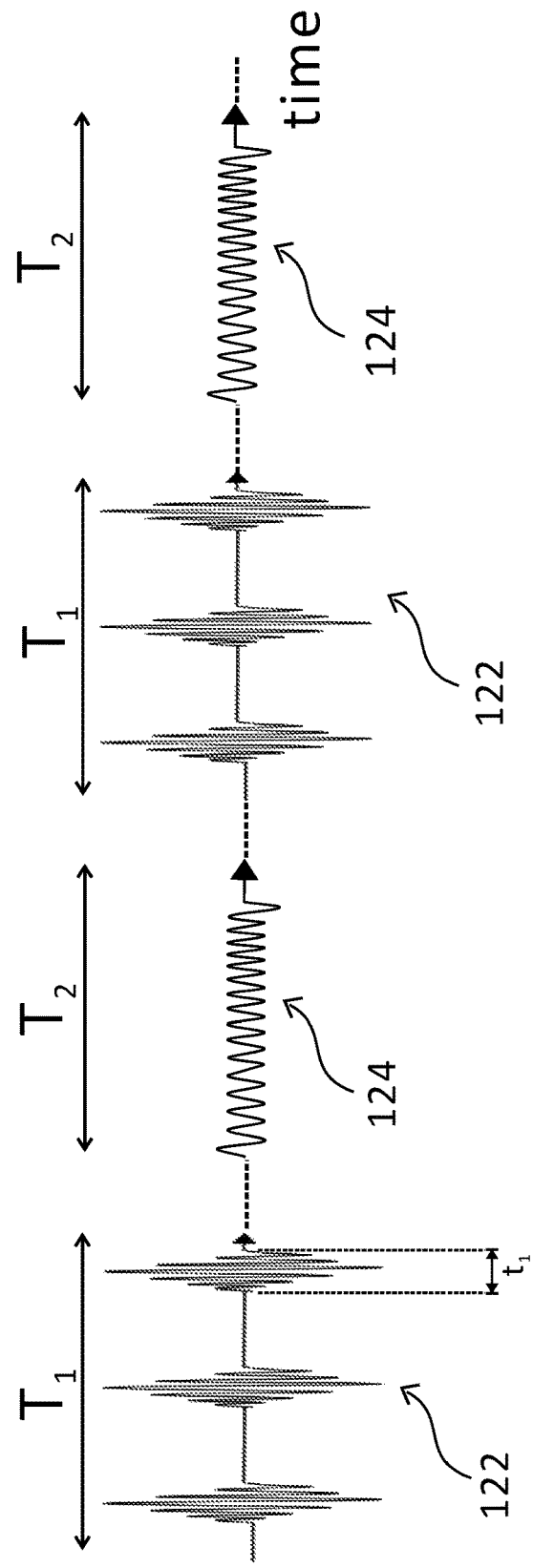
FIG. 1B is a diagram of an exemplary operation sequence of mode locked pulsed light and non-mode locked quasi-continuous-wave light according to an embodiment of this invention.

On the other hand "continuous wave" is an electromagnetic wave having constant amplitude and frequency of infinite duration, in the sense of mathematical analysis. Quasi-continuous-wave non-mode locked operation of a laser means that its pump source is switched on only for certain time intervals, which are short enough to reduce thermal effects significantly, but still long enough that the laser process is close to its steady state, i.e. the laser is optically in the state of continuous-wave operation. The duty cycle (percentage of "on" time) may be, e.g., a few percent, thus strongly reducing the heating and all the related thermal effects, such as thermal lensing and damage through overheating. Therefore, quasi-continuous-wave operation allows the operation with higher output peak powers at the expense of a lower average power. The duty cycle variation of quasi-continuous-wave 124 shown in FIG. 1B depicts the transition to reach steady state of continuous-wave operation. When the light source 120 is operated in "non-mode locked" condition, "quasi-continuous-wave" of light is produced.

FIG. 1B is a diagram of an exemplary operation sequence of mode locked pulsed light and non-mode locked quasi-continuous-wave light according to an embodiment of this invention. In FIG. 1B, the operation sequence is a repeated sequence of the mode locked pulsed light 122 and then the non-mode locked quasi-continuous-wave light 124. The operation duration of the mode locked pulsed light 122 is $T_1$, and the operation duration of the non-mode locked quasi-continuous-wave light is $T_2$. In the operation duration $T_1$, there are three pulses having pulse duration of $t_1$. In practical applications, number of $t_1$ pulses within $T_1$, and the durations of $t_1$, $T_1$, and $T_2$ are all adjustable.

Accordingly, the mode locked pulsed light 122 is used as a photo-annealing light to recover RIA onto the rare-earth doped optical fiber in real time. The non-mode locked light 124 is used as an optical amplifying light source to pump the rare-earth doped optical fiber. For this operation, each pulsed duration $t_1$ of the mode locked pulsed light 122 is much shorter than the operation duration $T_2$ of the non-mode locked quasi-continuous-wave light 124.

In an embodiment, an instantaneous power of the mode locked pulsed light 122 exceeds a saturated pumping power required for the rare-earth doped optical fiber, such that an output light power from the rare-earth doped optical fiber is insensitive to the variation of the mode locked pulse duration $t_1$.

In another embodiment, the mode locked pulsed light 122 may raise a core temperature of the rare-earth doped optical fiber to a temperature of at least 300° C. Hence, the mode locked pulsed light 122 may recover at least 50%, such as 50%, 60%, 70%, 80%, 90%, or 100%, of the RIA onto the rare-earth doped optical fiber at least partially in a range of 400-2000 nm.

In addition, a mode switching controller 130 may be also coupled with the light source 120 to control the operation sequences of the mode locked pulsed light 122 and the non-mode locked quasi-continuous-wave light 124, the operation duration $T_1$ and $T_2$, as well as the pulsed duration $t_1$ in FIG. 1B.

Exemplary configurations of the optical fiber assembly 110 are shown in FIGS. 2A-2B, 3, and 4. In these figures, the light sources 120 and the mode switching controller 130 are the same as the light source 120 and the mode switching controller 130 in FIG. 1A, and the detailed descriptions of the light sources 120 and the mode switching controller 130 are thus omitted below.

Figure 2A:
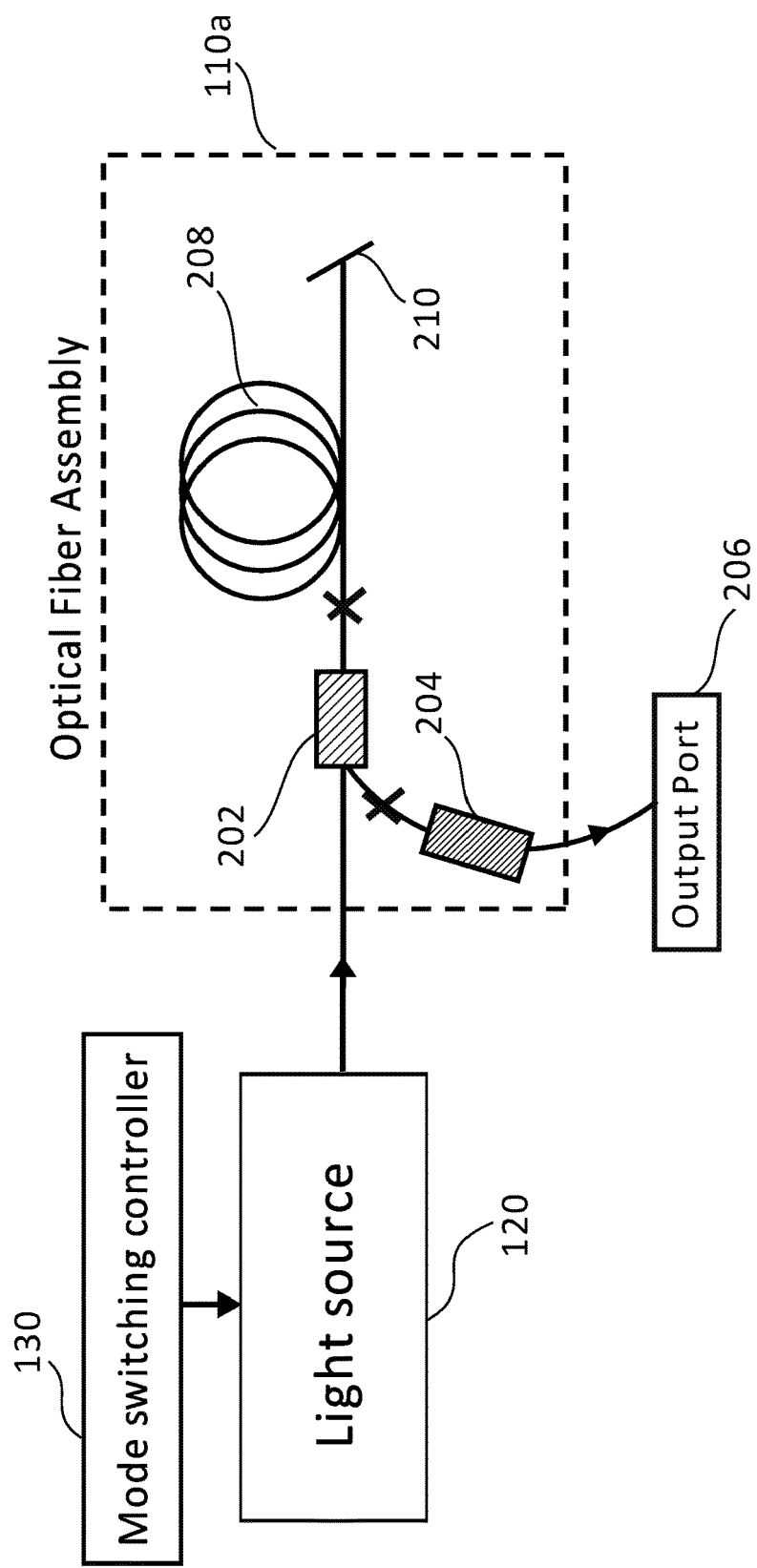
FIG. 2A is a diagram showing a configuration of single-pass backward fiber light source according to an embodiment of this invention.

FIG. 2A is a diagram showing a configuration of single-pass backward fiber light source according to an embodiment of this invention. In FIG. 2A, the optical fiber assembly 110a is used as a fluorescent fiber light source in a single-pass backward configuration. The optical fiber assembly 110a includes a 3-port WDM (wavelength division multiplexer) 202, an optical isolator 204, and a rare-earth-doped fiber 208. A first port of the WDM 202 is coupled with a light source 120, which is controlled by a mode switching controller 130. A second port of the WDM 202 is coupled to an output port 206 through the optical isolator 204. A third port of the WDM 202 is coupled to the rare-earth-doped fiber 208 with a fiber termination 210.

In FIG. 2A, light generated from 120 and then coupled into WDM 202 is directed into the rare-earth-doped fiber 208 to generate forward and backward amplified spontaneous emission (ASE) fluorescence light. The forward light is terminated by the fiber terminator 209, and the backward light is returned through the WDM 202, the isolator 204, and arrives at the output port 206. Such a broadband ASE fluorescence light is quite useful in fiber sensing applications, especially for fiber-optic gyros. If such an ASE fluorescence light device is to be used in space, such as for a space-grade fiber-optic gyro, space radiation will degrade the optical power output. Therefore, the light source 120 switched in mode locked and non-mode locked operations, as shown and explained in FIGS. 1A and 1B, is required to recover RIA and pump the rare-earth doped fiber 208 for generating a constant light output from the rare-earth doped fiber 208.

Figure 2B:
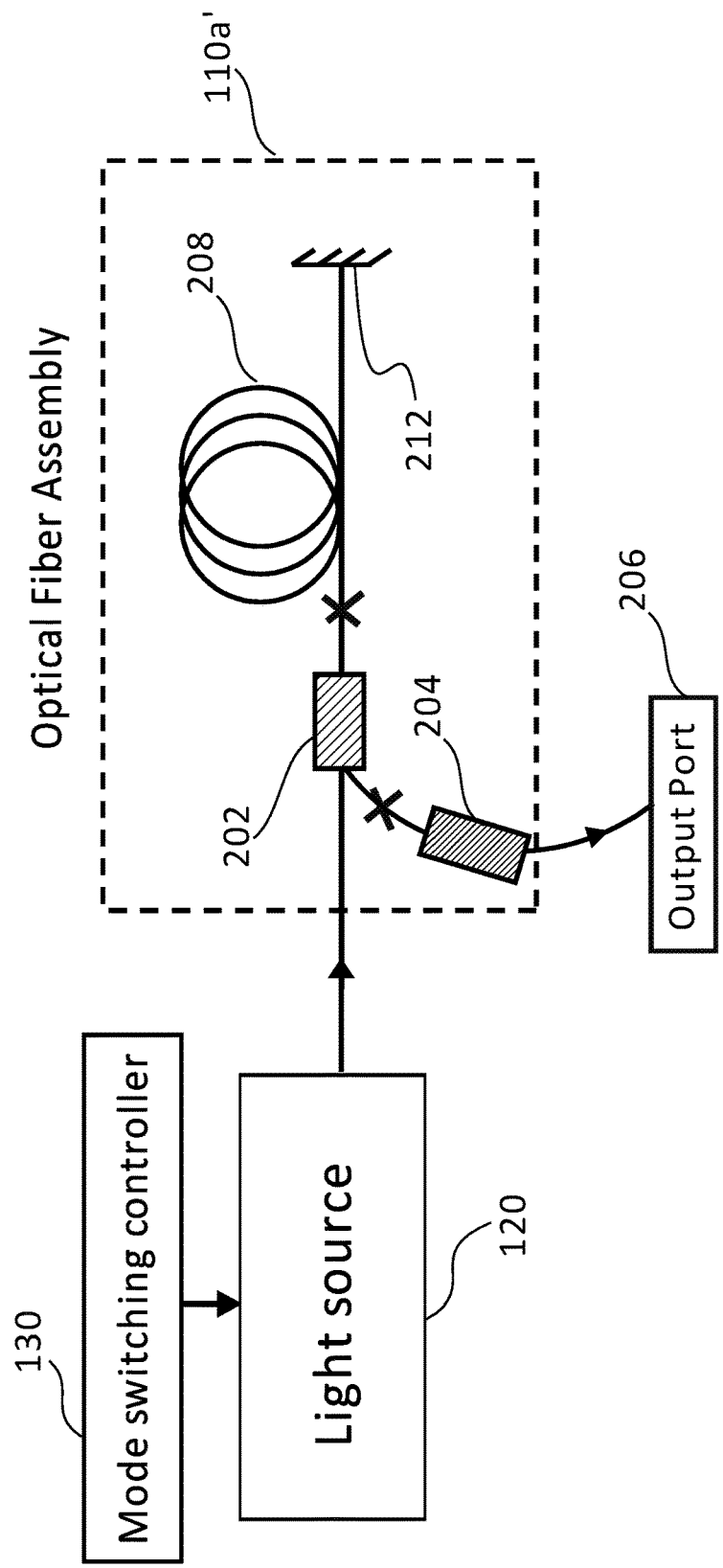
FIG. 2B is a diagram showing a configuration of double-pass backward fiber light source according to another embodiment of this invention.

FIG. 2B is a diagram showing a configuration of double-pass backward fiber light source according to another embodiment of this invention. In FIG. 2B, the optical fiber assembly 110a' is used as a fluorescent fiber light source in a double-pass backward configuration. Here the components used and the light propagation are the same as FIG. 2A except the fiber terminator 210 in FIG. 2A is replaced by a reflector 212 in FIG. 2B. In this configuration, light generating from 120 and then coupled into WDM 202 is directed into the rare-earth-doped fiber 208 to generate forward and backward amplified spontaneous emission (ASE) fluorescence light. The forward light is reflected by a reflector 212 and added to the existing backward light, which returns through the WDM 202, the isolator 204, and arrives at the output port 206. This double pass backward configuration provides more pumping efficiency for the output light power whereas the switching operation of the light source 120 is the same as shown and explained in FIGS. 1A and 1B.

Figure 3:
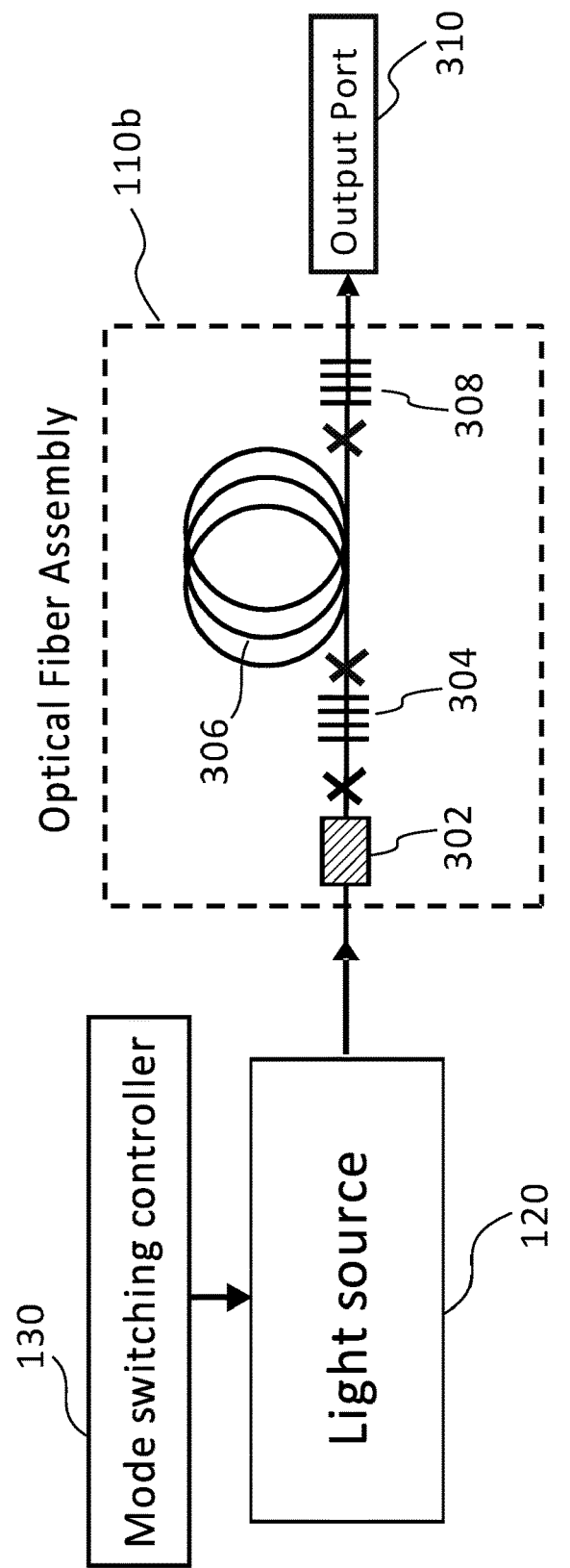
FIG. 3 is a diagram showing a configuration of fiber laser according to an embodiment of this invention.

FIG. 3 is a diagram showing a configuration of fiber laser according to an embodiment of this invention. In FIG. 3, the optical fiber assembly 110b is used as a fiber laser to produce a high-power coherent light. The optical fiber assembly 110b includes several optical elements to form a fiber laser cavity with rare-earth-doped fiber as a gain medium. Light generated from the light source 120 is coupled to the optical isolator 302, a highly reflective fiber Bragg grating (HR FGB) 304, a rare-earth-doped optical fiber 306, and a partially reflective fiber Bragg grating (PR FGB) 308, then go to an output port 310. HR FBG 304 and PR FBG 308 replace conventional dielectric mirrors to provide optical feedback and the formation of a resonant laser cavity.

Most rare-earth-doped optical fibers designed for fiber laser applications are double-clad fibers. The gain medium forms the core of the fiber with rare-earth-doped ions and other dopants, and is surrounded by two layers of cladding. The lasing mode propagates in the smaller core, while the pumping light propagating in the much larger inner cladding layer. The outer cladding keeps the pumping light confined. This arrangement allows the core to be pumped with a much higher-power beam than could otherwise be made to propagate in it. The lasing coherent light produced by the optical fiber assembly 110b is pumped by the non-mode locked quasi-continuous-wave light 124 emitted by the light source 120. As for RIA recovery, the light source is switched to mode locked operation. There are many other high-power fiber laser configurations, but the principle of mode switching operation for RIA recovery is the same.

Figure 4:
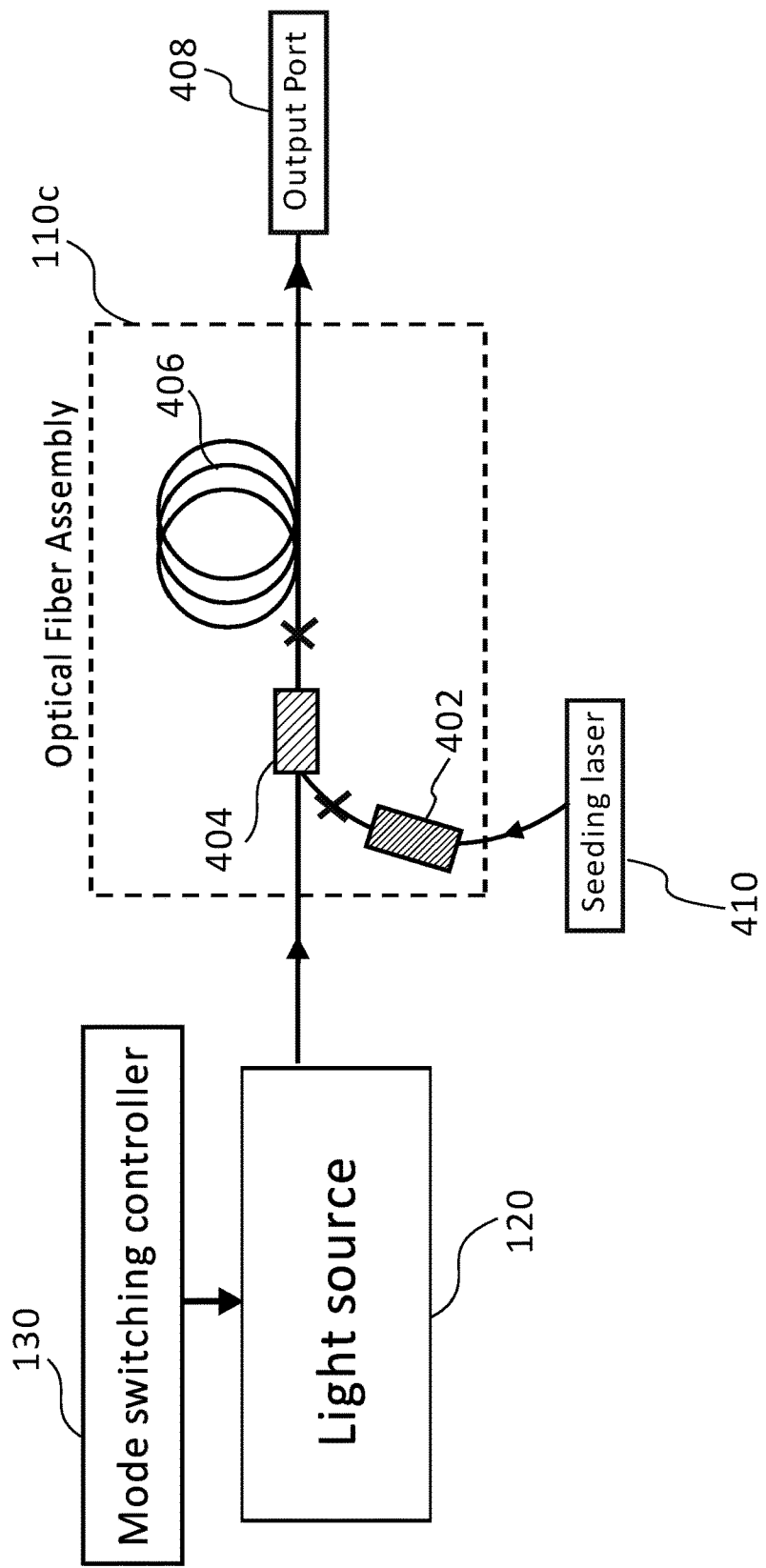
FIG. 4 is a diagram showing a configuration of a forward fiber amplifier according to an embodiment of this invention.

FIG. 4 is a diagram showing a configuration of a forward fiber laser amplifier according to an embodiment of this invention. In FIG. 4, the optical fiber assembly 110c is used as a fiber laser amplifier in a forward configuration. The optical fiber assembly 110c includes an optical isolator 402, a combiner 404, and a rare-earth doped optical fiber 406. A first port of the combiner 404 is coupled to the light source 120 controlled by a mode switching controller 130. A second port of the combiner 404 receives light from the seeding laser 410 through the optical isolator 402. A third port of the combiner 404 receives light from the first and the second ports thereof and couples both lights into the rare-earth-doped optical fiber 406, then to an output port 408.

In FIG. 4, under the normal operation, the light source 120 is in non-mode locked operation. Light from the light source 120 is transmitted through the first port of the combiner 404 to pump the rare-earth-doped fiber 406, which in turn provides gain to amplify the seed laser light 410 propagating through the isolator 402, the second port of the combiner 404, and the rare-earth doped fiber 406 before reaching the output port 408. Under radiation environment, for RIA recovery onto the rare-earth-doped fiber 406, the light source 120 is switched to mode locked operation with proper pulse settings. Seed laser can be either on or off during the RIA recovery period. In the configuration of FIG. 4, the propagating directions of the seed laser 410 and the light source 120 are the same. Therefore, this architecture is called as forward configuration. Other fiber amplifier architectures such as backward configuration, dual pump light source configuration, and others are all possible. However, their RIA recovery principles are all the same.

Method of Recovering Radiation-Induced-Attenuation in Real Time

The method of recovering RIA onto a rare-earth-doped optical fiber under irradiation comprises the following steps. In the first step, a light source is coupled to a rare-earth doped optical fiber. In the second step, a combination of mode locked pulsed light and non-mode locked quasi-continuous-wave light is emitted by the light source. The mode locked pulsed light is used to recover RIA onto the rare-earth doped optical fiber in real time, and the non-mode locked light is used to pump the rare-earth doped optical fiber as a gain medium. Each pulsed duration of the mode locked pulsed light is shorter than the operation duration of the non-mode locked quasi-continuous-wave light.

The details of the light source, the mode locked pulsed light, the non-mode locked quasi-continuous-wave light, and the rare-earth-doped optical fiber have been described above, and thus are omitted here.

Example: Er-Doped Al/P-Silica Fiber

According to an embodiment of this disclosure, a light generating from a solid-state laser is coupled into an optical fiber doped with rare-earth ions as a gain medium. The way of coupling a laser into an optical fiber can be determined by a person skilled in the art according to the actual needs, and thus is omitted here. The solid-state laser above is a Ti:sapphire mode locked laser (Tsunami, Spectra-Physics). The optical fiber above is an erbium-doped Al/P-silica fiber (ER-80-4/125, nLIGHT) with a length of 1 m. The concentrations of aluminum and erbium are 4.2 mole % and 1024 ppm, respectively.

Figure 5:
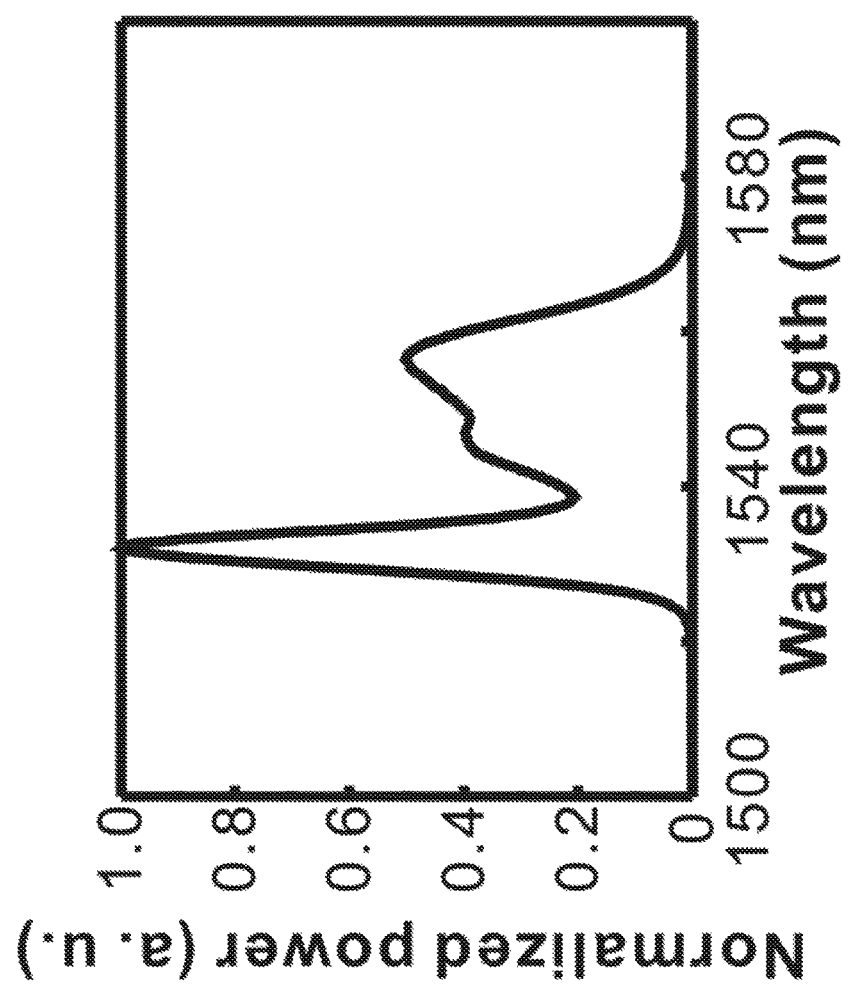
FIG. 5 shows a normalized fluorescence spectrum of the Er-doped Al/P-silica fiber.

The erbium-doped Al/P-silica fiber (abbreviated as EDF below) is adopted for generating 1550-nm fluorescence and an up-converted green light. Therefore, the fluorescence spectrum and energy diagram of Er ions are used to show the origins of the 1550-nm fluorescence and the up-converted green light of Er ions. First, a normalized fluorescence spectrum of the Er-doped Al/P-silica fiber analyzed by an optical spectrum analyzer (OSA) is shown in FIG. 5, and the energy-level diagram of erbium ions and their electron transition processes in generating green light emissions are shown in FIG. 6.

Figure 6:
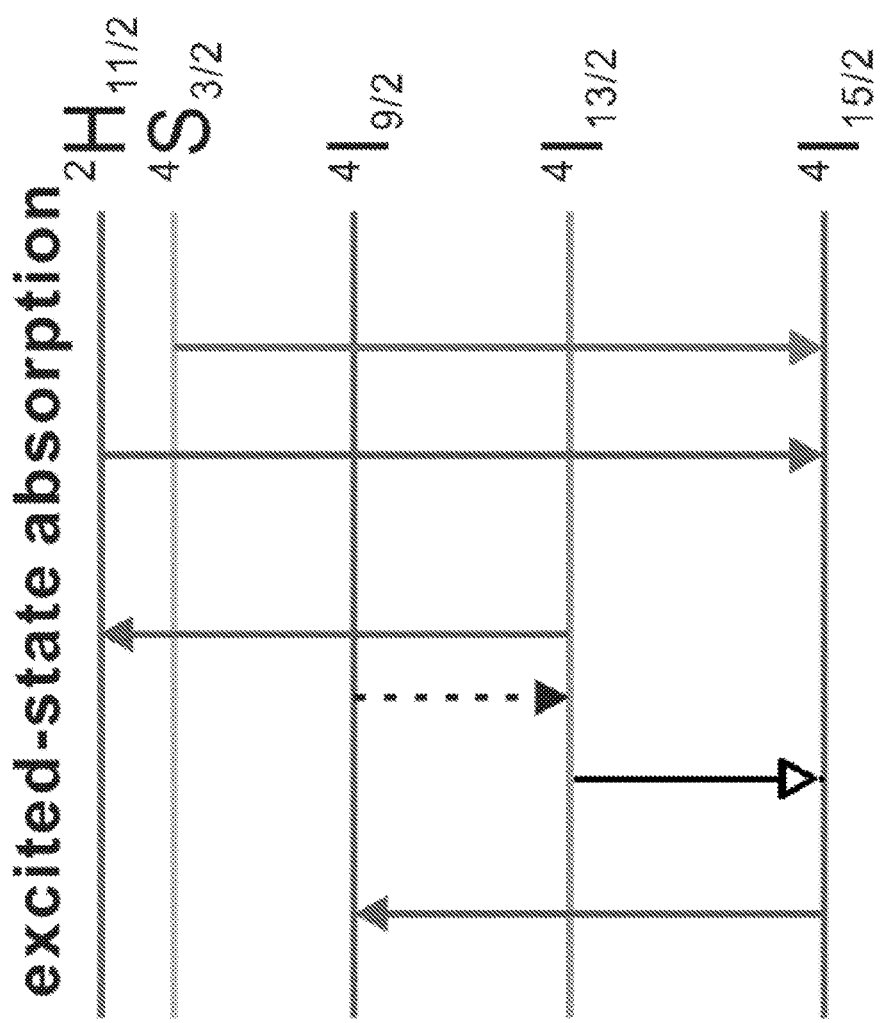
FIG. 6 is an energy-level diagram of erbium ions and their electron transition processes in generating green light emissions.

In FIG. 6, an upward transition of Er ions from ground state ($^4I_{15/2}$) to a higher excited state ($^4I_{9/2}$) is the ground-state absorption (GSA) of Er ions. Then the electrons in the higher excited state ($^4I_{9/2}$) will non-radiatively decay to the metastable state ($^4I_{13/2}$) to create heat. After the decay, some electrons may radiatively decay from the excited state ($^4I_{13/2}$) to the ground state ($^4I_{15/2}$) to emit the fluorescence of 1550 nm. Some electrons may be further pumped to the thermalized states ($^2H_{11/2}$ and $^4S_{3/2}$), and then decay to the ground state ($^4I_{15/2}$) with green light emission. Then, the green light emission is re-absorbed to the thermalized states of erbium ions. Accordingly, the up-converted green light of erbium ions is originated from the thermalized states ($^2H_{11/2}$ and $^4S_{3/2}$) to the ground state ($^4I_{15/2}$) transition after excited-state absorption (ESA).

Next, the relationship between the 1550-nm fluorescence power of the EDF and the central wavelength of the excitation laser light ($\lambda_c$) was investigated. In EDF, the prominent peak of GSA is found at approximately 790 nm. In order to find out the largest 1550-nm fluorescence generation, the central wavelength ($\lambda_c$) of the mode locked laser (MLL) was scanned from 770 nm to 840 nm. The full-width at half-maximum (FWHM, $\Delta\lambda$) of MLL was fixed to be 11 nm and the input average power was maintained at 170 mW.

Figure 7:
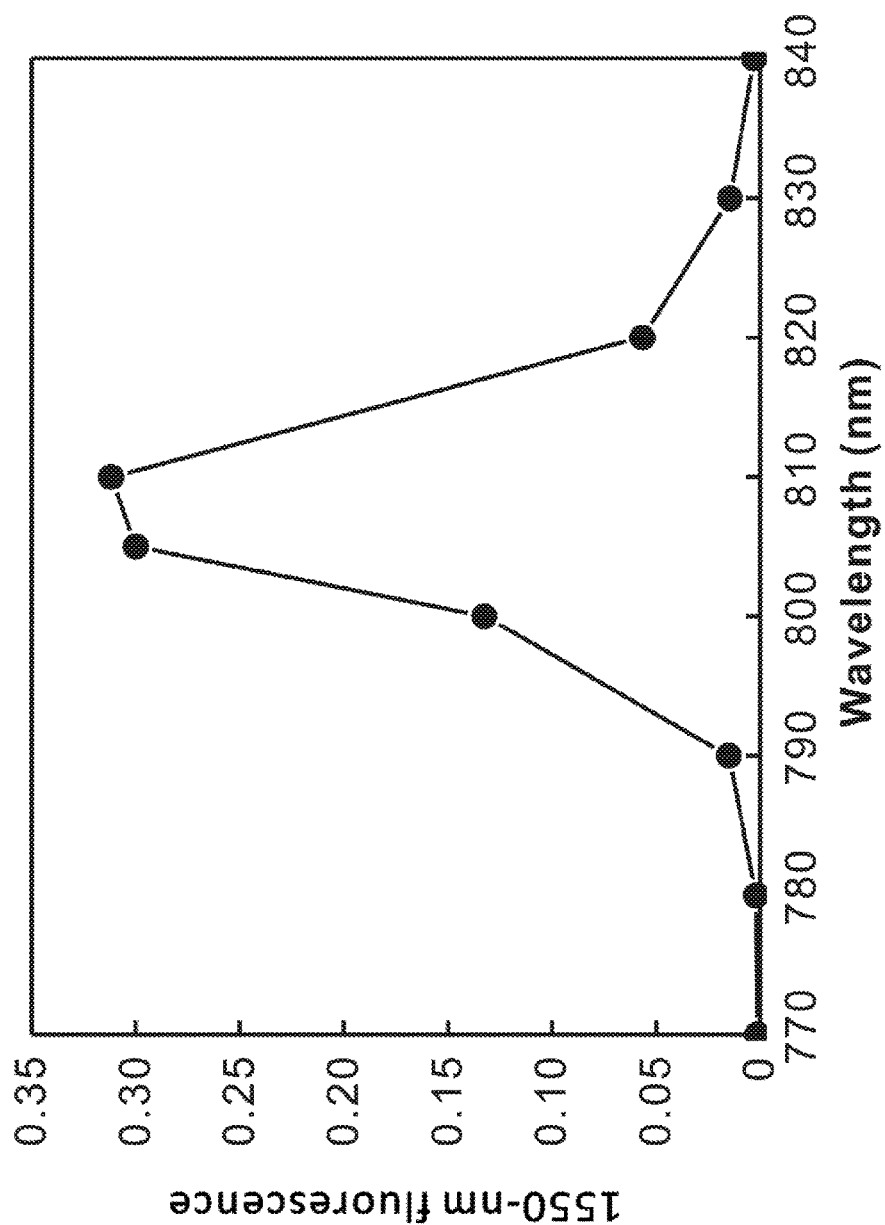
FIG. 7 is a diagram showing 1550-nm fluorescence power of the EDF under different excitation wavelengths at a fixed average input power of 170 mW.

FIG. 7 is a diagram showing 1550-nm fluorescence power of the EDF under different excitation wavelengths at a fixed average input power of 170 mW. In FIG. 7, the 1550-nm fluorescence power of the EDF reached maximum when $\lambda_c$ was 810 nm. Therefore, 810 nm was used as the excitation wavelength of the EDF for the following experiments.

To investigate the influence of the pulse width of the excitation laser light, the full width at half maximum (FWHM) of the excitation laser light was varied, and the central wavelengths of MLL and NMLL both were fixed at 810 nm. The time-bandwidth product is 0.315 because the excitation source is ultra-short pulses which have a temporal shape of the square hyperbolic secant function. Accordingly, the pulse duration $\Delta T$ of MLL can be calculated by $\Delta T = 0.315/\Delta f$, where $\Delta f$ is the spectral width.

Figure 8:
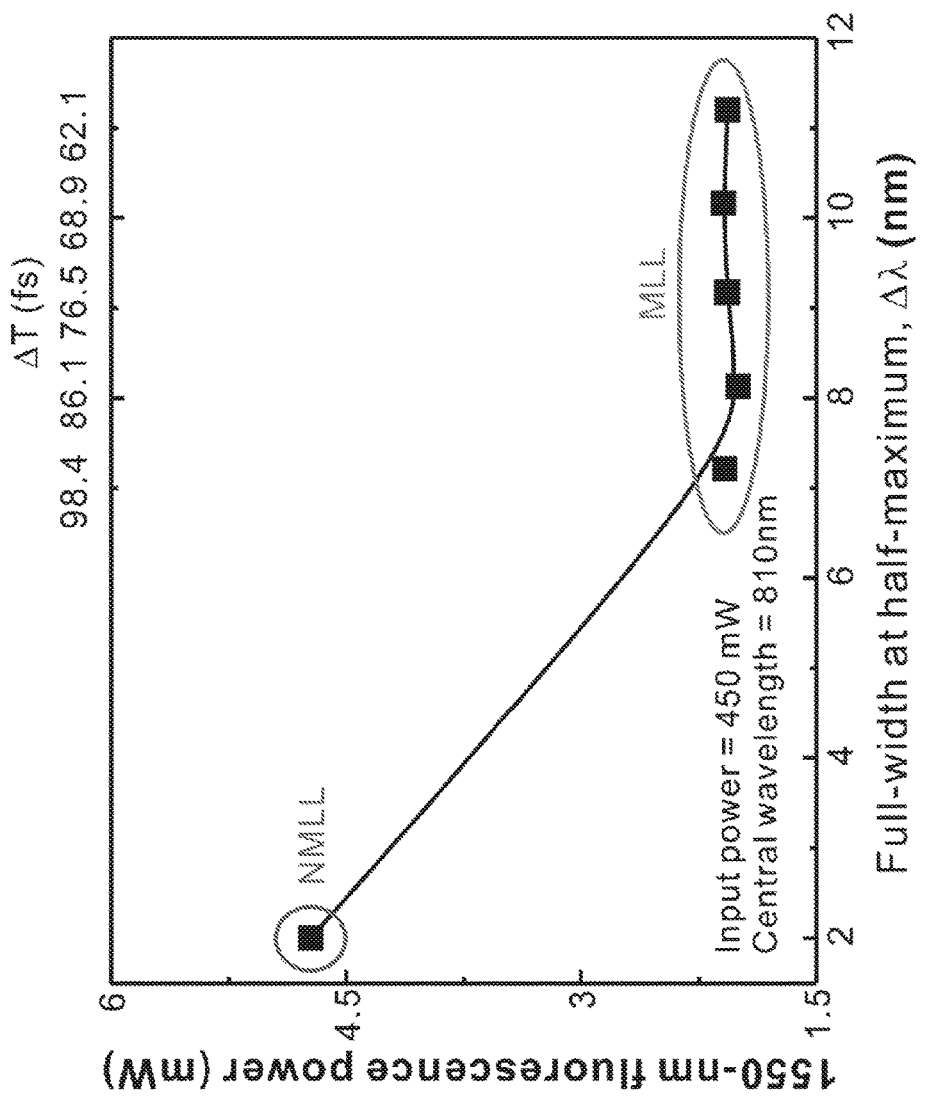
FIG. 8 is a diagram showing 1550-nm fluorescence power of the EDF under the non-mode locked laser (NMLL) and the mode locked laser (MLL) with different spectral widths which correspond to pulse widths of the pumping laser light as shown in the upper horizontal axis as ΔT.

FIG. 8 is a diagram showing 1550-nm fluorescence power of the EDF under the non-mode locked laser (NMLL) and the mode locked laser (MLL) with different spectral widths which correspond to pulse widths of the pumping laser light. In FIG. 8, the 1550-nm fluorescence powers are insensitive to the pulse duration when the excitation source is a MLL. Compared to the MLL excitation, the EDF pumped by NMLL excitation emits higher 1550-nm fluorescence power. For the pumping power of 450 mW, the 1550-nm fluorescence power generated by NMLL can be doubled as much as that generated by MLL.

Figure 9:
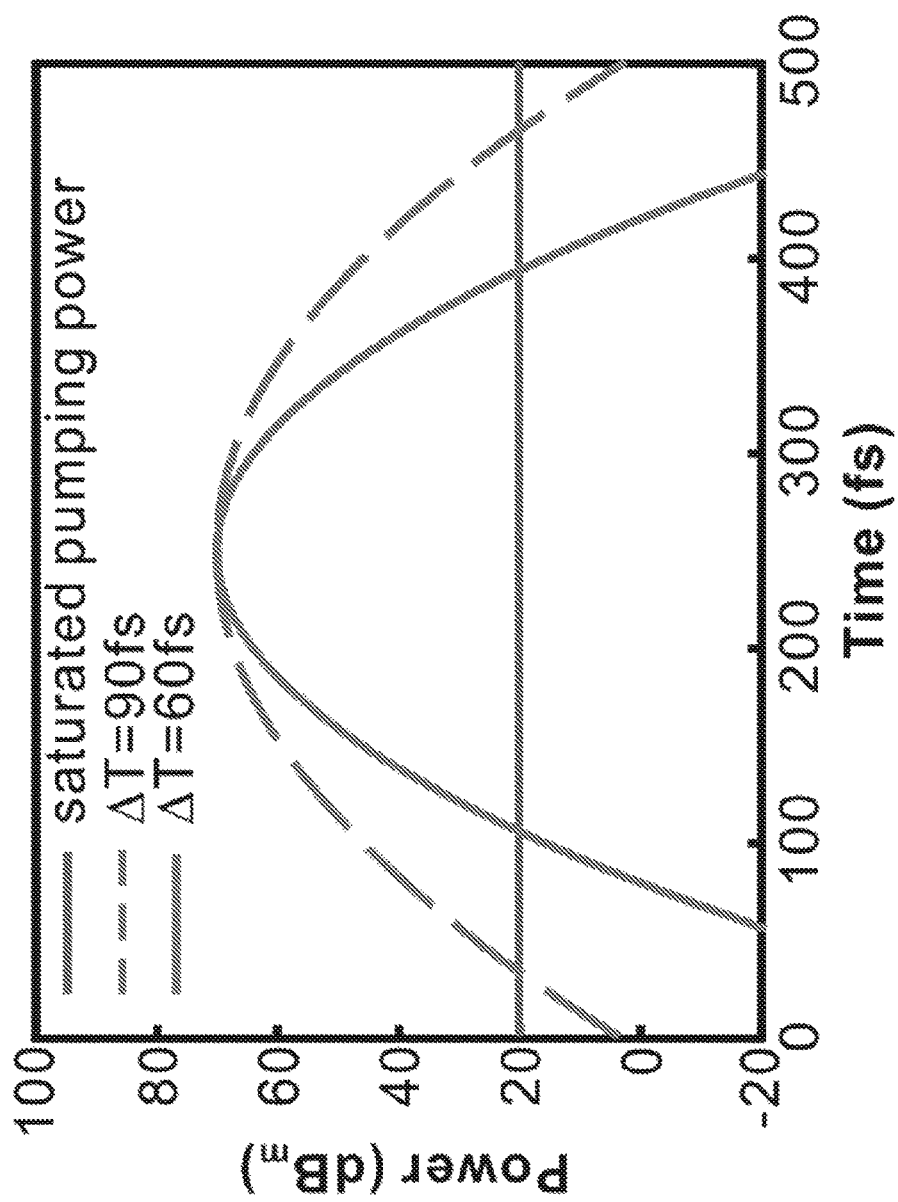
FIG. 9 is a diagram showing the relationship between the saturated pumping power and the instantaneous powers of the pulse shapes under the mode locked laser (MLL) operation.

The pulse-duration insensitive behavior can be explained by the following description. For a femtosecond laser pulse, the photon energy is concentrated in an ultra-short period of time, which results in a high-peak power. FIG. 9 is a diagram showing the relationship between the saturated pumping power and the instantaneous powers of the input laser pulses under the mode locked laser (MLL) operation. In FIG. 9, it can be seen that the instantaneous powers of the laser pulses are far greater than the saturated pumping power of GSA. In a general case of EDF amplifier, the saturated pumping power is ~20 dBm, which is equaled to ~100 mW. Therefore, the generation of 1550-nm fluorescence by MLL is almost power-independent.

In FIG. 8, the spectral width ($\Delta\lambda$) of the NMLL is about 2 nm. Although the NMLL contains many longitudinal modes, it is still analogous to CW laser due to the low instantaneous power of NMLL. Compared with the MLL, the NMLL is not easy to excite the electrons to the higher excited states ($^2H_{11/2}$ and $^4S_{3/2}$) because of the low instantaneous power of NMLL. Therefore, the NMLL is expected to produce a higher 1550-nm fluorescence power when pumping at the wavelength of 810 nm.

Figure 10:
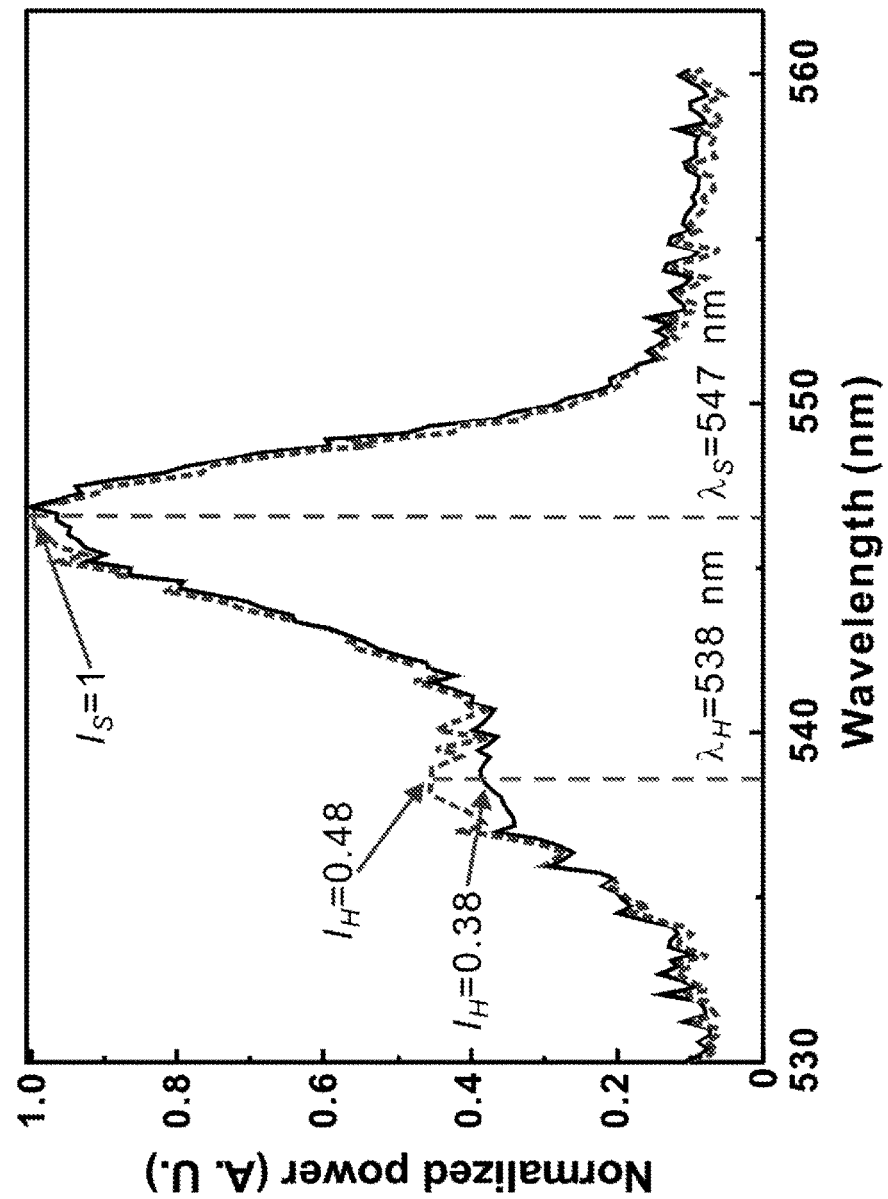
FIG. 10 is a diagram showing spectra of up-converted green light under the mode locked laser (MLL, dash line) and the non-mode locked laser (NMLL, solid line) excitations.

FIG. 10 shows spectra of up-converted green light under the MLL (dash line) and the NMLL (solid line) excitations. In FIG. 10, two prominent peaks occur at the wavelengths of 538 nm and 547 nm. These two peaks respectively correspond to the transitions from the two thermalized states ($^2H_{11/2}$ and $^4S_{3/2}$) to the ground state.

The intensity ratio R is defined by the equation (1) below.

$$R = I_H/I_S = C\exp(-\Delta E/kT) \quad (1)$$

$I_H$: the emitted intensity from $^2H_{11/2}$ to ground state
$I_S$: the emitted intensity from $^4S_{3/2}$ to ground state
$\Delta E$: the energy difference between the two thermalized states
C: a constant for a particular fiber
K: Boltzmann constant From FIG. 10, the intensity ratio R can be calculated for both cases of the MLL and NMLL. $R_{MLL}$ equals to 0.48 for the MLL excitation, and $R_{NMLL}$ equals to 0.38 for the NMLL excitation. Accordingly, the temperature T inside the fiber core under mode locked and non-mode locked laser operations can be expressed as the equation (2) below.

$$T_{MLL,NMLL} = -\Delta E/[k \ln(R_{MLL,NMLL}/C)] \quad (2)$$

Then, the relationship between $T_{MLL}$ and $T_{NMLL}$ can be derived as the equation (3) below.

$$T_{MLL} = \frac{T_{NMLL}}{1 + \frac{T_{NMLL} \times k \times \ln(R_{NMLL}/R_{MLL})}{\Delta E}} \quad (3)$$

Figure 11:
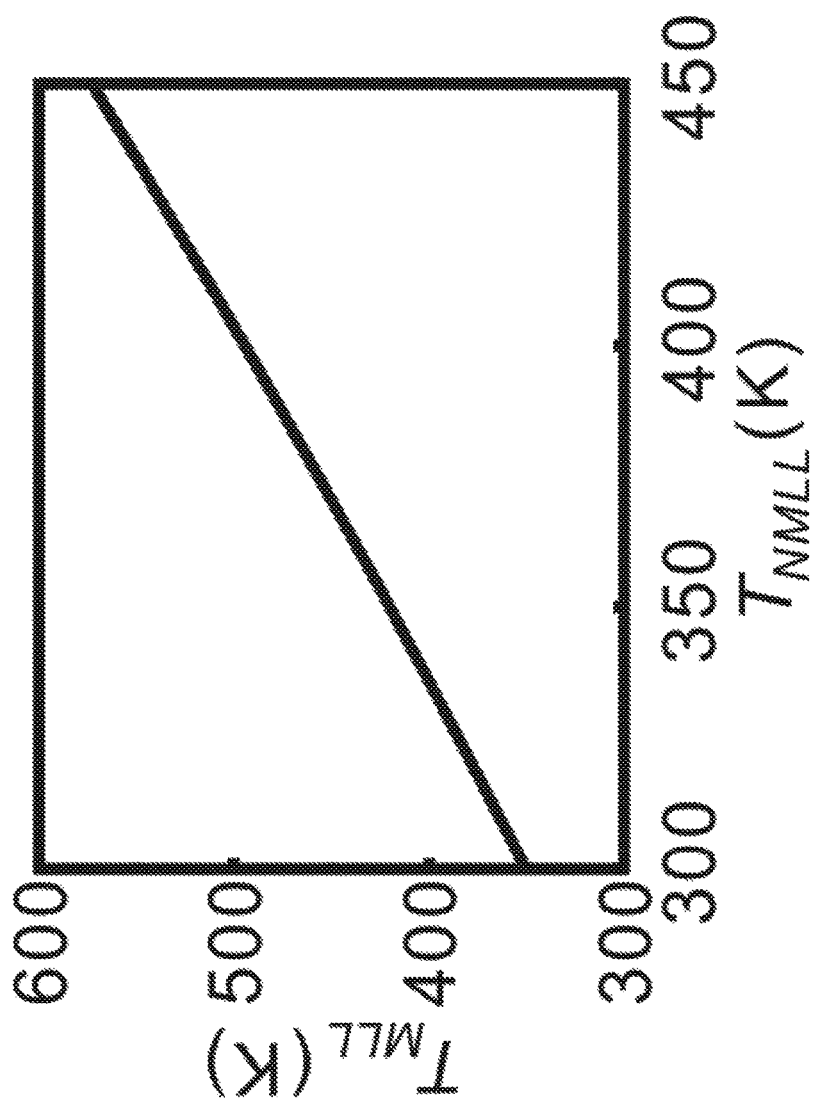
FIG. 11 is a diagram showing the relationship between $T_{MLL}$ and $T_{NMLL}$ temperatures inside the fiber core, wherein $T_{NMLL}$ is the core temperature for non-mode locked laser (NMLL) operation, and $T_{MLL}$ is the core temperature for mode locked laser (MLL) operation.

The obtained relationship between $T_{NMLL}$ and $T_{MLL}$ was shown in FIG. 11. Compared with the NMLL, the MLL creates a higher temperature inside the EDF core.

In light of foregoing, the quasi-continuous-wave light (non-mode locked operation) is better than the pulsed light (mode locked operation) to generate the 1550-nm fluorescence power due to the lower instantaneous pumping power. On the other hand, the green light spectrum presents that the MLL can produce a higher temperature inside the fiber core. Therefore, the MLL is quite suitable to be used for annealing the gamma-ray irradiated onto rare-earth doped fibers.

A demonstration on RIA recovery onto a 1-meter Erbium-doped fiber (EDF ER40-4/125 by nLIGHT) was performed when the light source was switched from non-mode locked to mode locked operation. Before gamma irradiation, the fluorescence power of EDF was observed to be 0.25 mW. The tested EDF was then placed inside a chamber with cobalt-60 gamma source. The gamma-irradiation dose rate was 0.53 kGy/hr, and the accumulated dose equaled to 3.18 kGy. A mode locked laser ($\lambda_c$=810 nm, $\Delta\lambda$=11 nm, and input average power=500 mW) was used to pump the gamma-irradiated EDF. The fluorescence gradually increased with time, as shown in FIG. 12.

Figure 12:
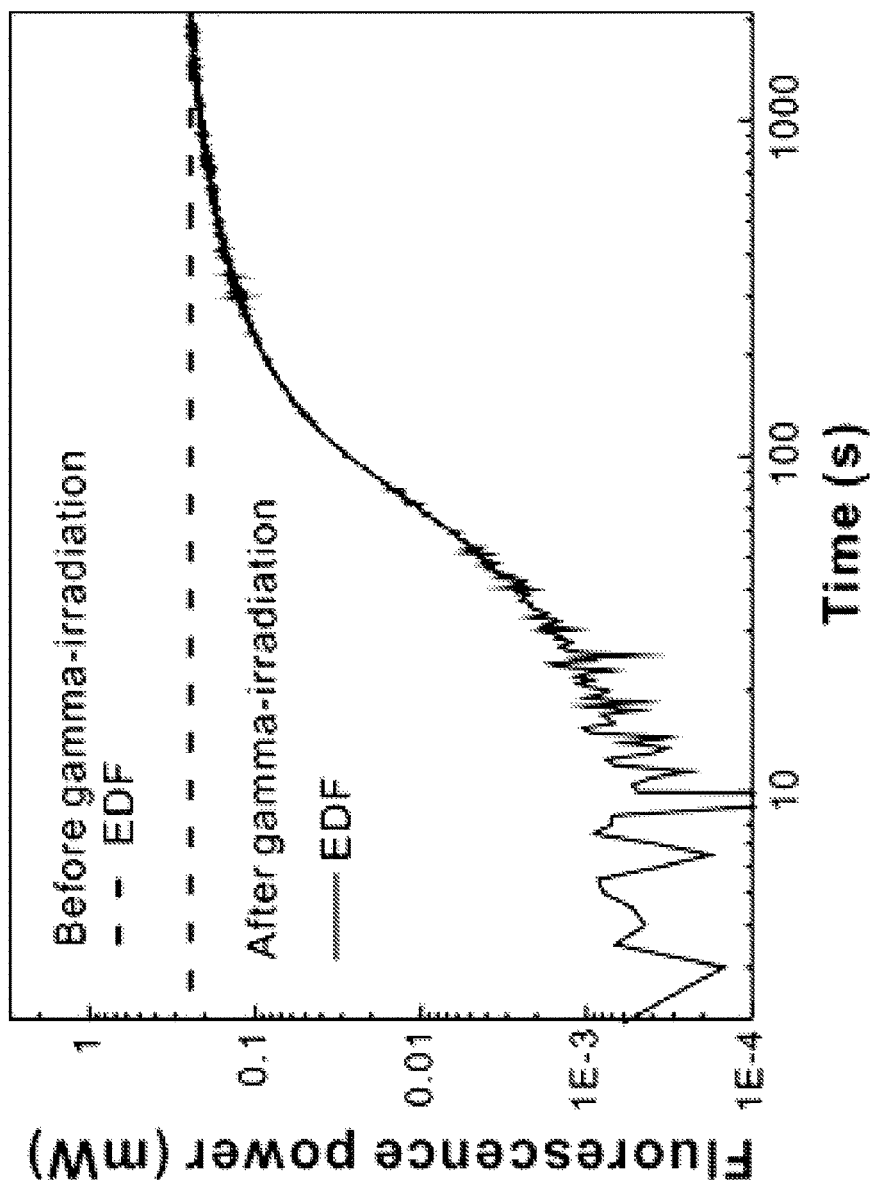
FIG. 12 demonstrates photo-annealed RIA recovery of fluorescence power through mode switching to the mode locked laser (MLL) operation at the time of 0 second.

FIG. 12 demonstrates photo-annealed RIA recovery of fluorescence power through mode switching to the mode locked laser (MLL) operation at the time of 0 second. Black dashed line represents the fluorescence power of Erbium-doped fiber (EDF) before gamma irradiation and in non-mode locked operation. Black solid line represents the fluorescence power of EDF after gamma irradiation and under mode locked laser operation. The fluorescence power output was returned to the initial state before gamma radiation after 25 minutes. In space environment, the typical gamma irradiation dose rate is ~11 mGy/hr for low earth orbit, about 50,000 times smaller than the test dose rate. The RIA recovery in space environment is expected to be in real time Therefore, a method of real-time recovering a rare-earth-doped optical fiber is provided. In this real-time recovering method, only one single laser is needed to be the pumping light source and the recovering light source. The laser is operated to be switched between a locked mode and a non-locked mode. This real-time recovering method can be used to construct an anti-irradiation optical fiber component, module, and system used in radiation environment.

It will be apparent to those skilled in the art that various modifications and variations can be made to the configurations of the present invention without departing from the scope or spirit of the invention. In view of the foregoing, it is intended that the present invention cover modifications and variations of this invention provided they fall within the scope of the following claims.

What is claimed is:

1. An optical fiber apparatus, comprising:
    an optical fiber assembly comprising at least a rare-earth doped optical fiber; and
    a light source, coupled to the optical fiber assembly, for emitting a combination of mode locked pulsed light and non-mode locked quasi-continuous-wave light, wherein the mode locked pulsed light raises a core temperature of the rare-earth doped optical fiber to a temperature of at least 300° C. to recover radiation-induced-attenuation (RIA) onto the rare-earth doped optical fiber in real time, the non-mode locked light are used to pump the rare-earth doped optical fiber, and pulsed durations of the mode locked pulsed light are shorter than operation durations of the non-mode locked quasi-continuous-wave light.

2. The optical fiber apparatus of claim 1, wherein the light source is a laser or a broadband light source.

3. The optical fiber apparatus of claim 1, wherein a wavelength of the mode locked pulsed light and the non-mode locked quasi-continuous-wave light is 550-1200 nm.

4. The optical fiber apparatus of claim 1, wherein the light source is an optical amplifying light source for exciting rare-earth doped optical fiber.

5. The optical fiber apparatus of claim 1, wherein the light source is a photo-annealing light source.

6. The optical fiber apparatus of claim 1, wherein an instantaneous power of the mode locked pulsed light exceeds a saturated pumping power required for the rare-earth doped optical fiber, such that an output light power from the rare-earth doped optical fiber is insensitive to the variation of the mode-lock pulse duration.

7. The optical fiber apparatus of claim 1, wherein the mode locked pulsed light recover at least 50% of the RIA onto the rare-earth doped optical fiber.

8. The optical fiber apparatus of claim 1, wherein the mode locked pulsed light recover the RIA on the rare-earth doped optical fiber at least partially in a range of 400-2000 nm.

9. A method of recovering radiation-induced-attenuation (RIA) onto a rare-earth-doped optical fiber under irradiation, the method comprising:
    coupling a light source to a rare-earth doped optical fiber; and
    emitting a combination of mode locked pulsed light and non-mode locked quasi-continuous-wave light by the light source, wherein the mode locked pulsed light raises a core temperature of the rare-earth doped optical fiber to a temperature of at least 300° C. to recover RIA onto the rare-earth doped optical fiber in real time, and the non-mode locked light are used to pump the rare-earth doped optical fiber.

10. The method of claim 9, wherein pulsed durations of the mode locked pulsed light are shorter than operation durations of the non-mode locked quasi-continuous-wave light.

11. The method of claim 9, wherein the light source is a laser or a broadband light source.

12. The method of claim 9, wherein a wavelength of the mode locked pulsed light and the non-mode locked quasi-continuous-wave light is 550-1200 nm.

13. The method of claim 9, wherein an instantaneous power of the mode locked pulsed light exceeds a saturated pumping power required for the rare-earth doped optical fiber, such that an output light power from the rare-earth doped optical fiber is insensitive to the variation of the mode-lock pulse duration.

14. The method of claim 9, wherein the mode locked pulsed light recover at least 50% of the RIA onto the rare-earth doped optical fiber.

15. The method of claim 9, wherein the mode locked pulsed light recover the RIA onto the rare-earth doped optical fiber at least partially in a range of 400-2000 nm.

* * * * *